(12) United States Patent
Yajima et al.

(10) Patent No.: US 8,475,016 B2
(45) Date of Patent: Jul. 2, 2013

(54) OPTICAL DEVICE

(75) Inventors: Masatoshi Yajima, Osaka (JP);
Tomoaki Tojo, Hyogo (JP); Yasushi Kobayashi, Osaka (JP)

(73) Assignee: Panasonic Corporation, Osaka (JP)

(*) Notice: Subject to any disclaimer, the term of this patent is extended or adjusted under 35 U.S.C. 154(b) by 386 days.

(21) Appl. No.: 12/789,032

(22) Filed: May 27, 2010

(65) Prior Publication Data
US 2010/0302784 A1    Dec. 2, 2010

(30) Foreign Application Priority Data

May 29, 2009    (JP) .................. 2009-129875

(51) Int. Cl.
*F21V 17/00*    (2006.01)
(52) U.S. Cl.
USPC ..................... 362/455; 362/311.01
(58) Field of Classification Search
USPC ........................... 362/455, 311.01
See application file for complete search history.

(56) References Cited

U.S. PATENT DOCUMENTS

| | | | | |
|---|---|---|---|---|
| 4,370,358 | A | * | 1/1983 | Hayes et al. ............... 427/515 |
| 5,844,410 | A | * | 12/1998 | Ikuta et al. ............... 324/96 |
| 2006/0062139 | A1 | | 3/2006 | Oozeki et al. |
| 2010/0119746 | A1 | | 5/2010 | Igarashi et al. |

FOREIGN PATENT DOCUMENTS

| | | |
|---|---|---|
| JP | 3-160079 | 7/1991 |
| JP | 2001-160229 | 6/2001 |
| JP | 2006-065943 | 3/2006 |
| JP | 2006-294917 | 10/2006 |
| JP | 2007-051281 | 3/2007 |
| JP | 2007-294004 | 11/2007 |
| JP | 2008-305516 | 12/2008 |
| JP | 2008305516 | * 12/2008 |
| JP | 2009-001766 | 1/2009 |
| JP | 2009-047919 | 3/2009 |
| WO | 2008/093648 | 8/2008 |

\* cited by examiner

*Primary Examiner* — Anh Mai
*Assistant Examiner* — Brenitra M Lee
(74) *Attorney, Agent, or Firm* — Hamre, Schumann, Mueller & Larson, P.C.

(57) ABSTRACT

The present invention provides an optical device including: a light source; an optical element to be irradiated with light emitted from the light source; and a supporting member for supporting the optical element through a cured product of an adhesive. This cured product of the adhesive contains a thermoplastic elastic material. The present invention also provides an optical device including: a light source; an optical element to be irradiated with light emitted from the light source; and a supporting member for supporting the optical element through a cured product of an adhesive. This cured product of the adhesive has a Young's modulus of at least 1.0E+5 Pa but less than 1.0E+7 Pa in an exponential expression, in a temperature range that the cured product of the adhesive reaches due to heat generation during operation.

7 Claims, 6 Drawing Sheets

OPTICAL DEVICE

BACKGROUND OF THE INVENTION

1. Field of the Invention

The present invention relates to an optical device including a light source, and an optical element through which light from the light source passes.

2. Description of Related Art

Conventionally, there have been developed and manufactured optical pickup devices for recording or reproducing information on or from various optical discs such as CDs (Compact Discs), DVDs (Digital Versatile Discs), and BDs (Blu-ray Discs).

For example, as shown in JP 2008-305516 A, such an optical pickup device includes a light source (for example, a semiconductor laser), and an optical element (for example, an objective lens) through which light emitted from the light source passes. The optical element is fixed with an adhesive to the device body or its components such as a lens holder of an objective lens driving device. The adhesive is a resin that can be cured by ultraviolet light (UV-curable resin).

Conventionally, glass has been used as a material for optical elements. Recently, however, plastic has been used as a material for optical elements, in response to a demand for cost reduction in optical pickup devices.

With an increase in the capacity of optical discs, short-wavelength lasers have been used as light sources. For example, an infrared laser with a center wavelength of 780 nm is used as a light source for CDs. A red laser with a center wavelength of 650 nm is used as a light source for DVDs. A blue-violet laser with a center wavelength of 405 nm is used as a light source for BDs.

SUMMARY OF THE INVENTION

An optical device, in which an optical element made of plastic having a lower modulus of elasticity than glass is used, has a drawback of being more likely to suffer from aberrations in the optical element as the wavelength of a light source decreases.

In order to overcome the above drawback, it is an object of the present invention to provide an optical device including a light source and an optical element, in which the occurrence of aberrations in the optical element can be reduced even if the use of the optical device increases.

The optical device of the present invention includes: a light source; an optical element to be irradiated with light emitted from the light source; and a supporting member for supporting the optical element through a cured product of an adhesive. The cured product of the adhesive contains a thermoplastic elastic material.

In another aspect, the optical device of the present invention includes: a light source; an optical element to be irradiated with light emitted from the light source; and a supporting member for supporting the optical element through a cured product of an adhesive. The cured product of the adhesive has a Young's modulus of at least 1.0E+5 Pa but less than 1.0E+7 Pa in an exponential expression, in a temperature range that the cured product of the adhesive reaches due to heat generation during operation.

According to the present invention, in the optical device including the light source and the optical element, the occurrence of aberrations in the optical element can be reduced even if the use of the optical device increases.

DETAILED DESCRIPTION OF THE INVENTION

The present invention is an optical device including: a light source; an optical element to be irradiated with light emitted from the light source; and a supporting member for supporting the optical element through a cured product of an adhesive, and is characterized in that the cured product of the adhesive contains a thermoplastic elastic material.

Figure 6:
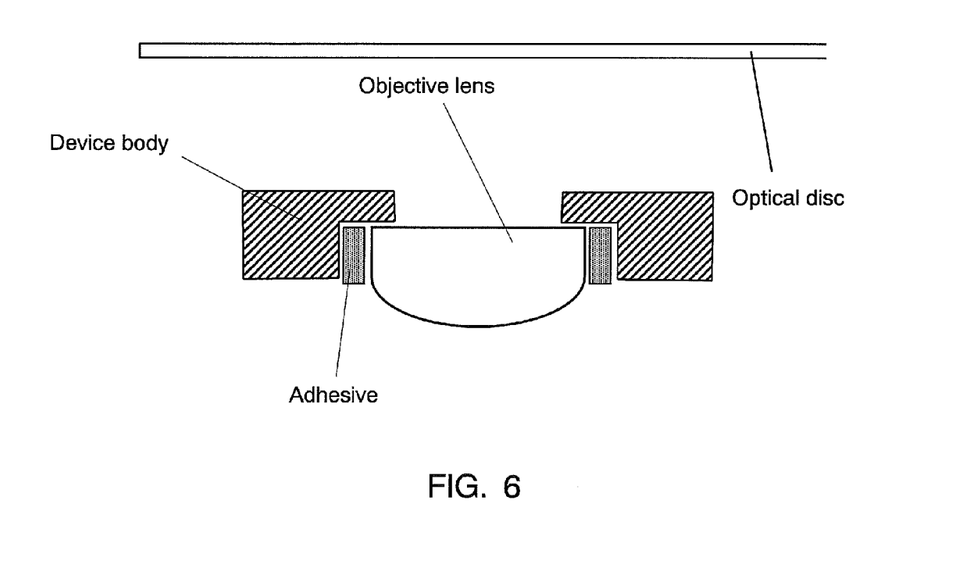
FIG. 6 is a diagram illustrating a mechanism responsible for the occurrence of aberrations in the optical device.

When a blue-violet laser is used as the light source of the optical device, the cured product of the adhesive may be exposed to a part of the laser light emitted from the light source. This is because the adhesive is applied in the vicinity of the optical element, as shown in FIG. 6. Conventionally, a UV-curable resin has been used as the adhesive. The emitted light includes wavelengths close to those of ultraviolet light. Therefore, when the cured product of the adhesive is exposed to a part of the emitted light, the remaining unreacted photopolymerization initiator in the cured product of the adhesive causes a curing reaction. As a result, the cured product of the adhesive is cured further and its quality is changed (for example, it shrinks or becomes deformed). Accordingly, as the use of the optical device increases, that is, as the continuous blue-violet laser irradiation time increases, the curing of the cured product of the adhesive proceeds further and further.

As the cured product of the adhesive is cured further in this way, its cure shrinkage and deformation generate stresses, which change the position, posture, shape, etc. of the optical element. Particularly, since the plastic optical element has a lower modulus of elasticity than a glass optical element, the change in the shape (aberration) of the plastic optical element increases accordingly. That is, in the optical device including the plastic optical element, the optical element is more affected by the further curing of the cured product of the adhesive. Therefore, aberrations such as astigmatism and coma occur as the use of the optical device increases, and as a result, the quality of the optical device cannot be maintained.

The cured product of the adhesive of the present invention, however, contains a thermoplastic elastic material. Therefore, even when the further curing of the cured product of the adhesive proceeds as the use of the optical device increases, the thermoplastic elastic material alleviates the stresses caused by the cure shrinkage, deformation, etc. As a result, the occurrence of aberrations in the optical element can be reduced.

The adhesive contains a photo-curing component and the thermoplastic elastic material. As the thermoplastic elastic material, a thermoplastic elastomer can be used suitably. The photo-curing component contains a polymerizable compound and a photopolymerization initiator. Known polymerizable compounds and photopolymerization initiators can be used for the photo-curing component.

Preferably, the content of the thermoplastic elastic material in the cured product of the adhesive is 20 to 30% by weight. Preferably, the cured product of the adhesive does not show light absorption in a wavelength range of the light emitted from the light source.

In another aspect, the present invention is characterized in that the cured product of the adhesive has a Young's modulus of at least 1.0E+5 Pa but less than 1.0E+7 Pa in an exponential expression, in a temperature range (for example, from 65° C. to 85° C.) that the cured product of the adhesive reaches due to heat generation during operation.

As described above, the further curing of the cured product of the adhesive proceeds as the use of the optical device increases, and as a result, stresses are generated in the optical element. Because of the above feature, however, when the temperature of the cured product of the adhesive is raised due to the heat generation during the operation of the optical device, the cured product of the adhesive is softened. This softening of the cured product of the adhesive alleviates the stresses generated in the optical element. As a result, the occurrence of aberrations in the optical element can be reduced.

In the present invention, it is more effective when the optical element is made of a plastic material having a lower modulus of elasticity than glass. As used herein, the phrase "a plastic material having a lower modulus of elasticity than glass" means that the plastic material has a lower modulus of elasticity in bending than glass, measured according to ISO 178, in a temperature range (for example, from 0° C. to 85° C.) in which the optical element is used. The term "plastic" means a synthetic resin, and such synthetic resins include not only thermoplastic resins but also thermosetting resins.

In the present invention, it is preferable that the light source emit light with a center wavelength of 405 nm.

Hereinafter, specific embodiments of the present invention will be described with reference to the accompanying drawings.

(First Embodiment)

<1. Configuration of Optical Device>

The configuration of an optical pickup 100 is described with reference to FIG. 1, as one embodiment of the optical device of the present invention. The optical pickup 100 can be used for a personal computer, an optical disc player, an optical disc recorder, etc.

Figure 1:
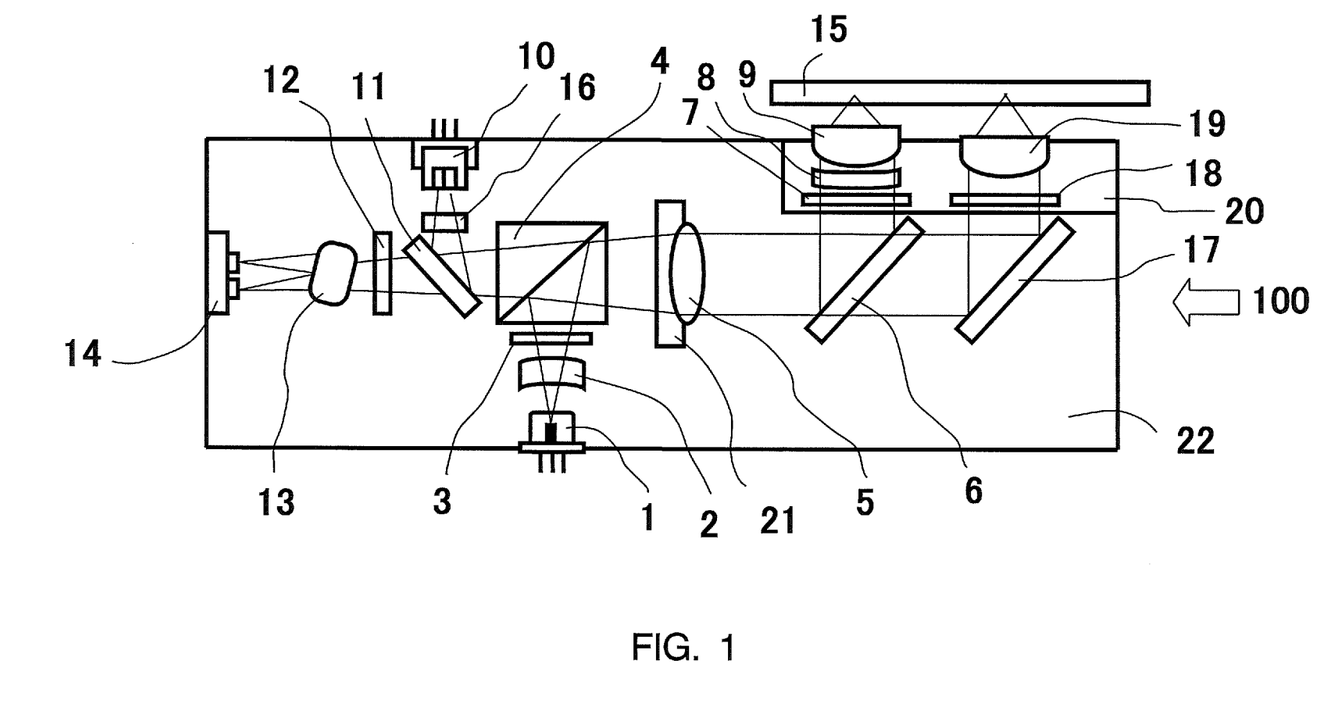
FIG. 1 is a diagram showing a configuration example of an optical pickup according to an embodiment of the present invention.

FIG. 1 is a diagram showing the configuration of the optical pickup 100. The optical pickup 100 includes a lens holder 20, a collimating lens holder 21, and a base 22 on which the lens holder 20 and the collimating lens holder 21 are provided. On the lens holder 20, a λ/4 plate 7 for blue-violet light, a diffraction lens 8, an objective lens 9 for blue-violet light, a λ/4 plate 18 for red/infrared light, and an objective lens 19 for red/infrared light are provided. On the collimating lens holder 21, a collimating lens 5 is provided. On the base 22, a blue-violet laser 1, a relay lens 2, a λ/2 plate 3 for blue-violet light, a beam splitter 4, a flip-up mirror 6 for blue-violet light, a red/infrared laser 10, a plate beam splitter 11, a first diffraction element 12, a detection lens 13, a detector unit 14, a second diffraction element 16, and a flip-up mirror 17 for red/infrared light are provided. In FIG. 1, an optical disc 15 is mounted on a disc tray not shown.

The blue-violet laser 1 is a light source for BDs, and is configured to emit light with a center wavelength of 405 nm. The blue-violet laser 1 can be embodied by a semiconductor laser. The blue-violet laser 1 need not be a semiconductor laser, and may be a diode laser.

The relay lens 2, the collimating lens 5, the diffraction lens 8, the objective lens 9 for blue-violet light, the detection lens 13, and the objective lens 19 for red/infrared light are made of plastic. For example, the relay lens 2, the collimating lens 5, the diffraction lens 8, the objective lens 9 for blue-violet light, the detection lens 13, and the objective lens 19 for red/infrared light can be made of a cycloolefin polymer. The cycloolefin polymer is a material formed from cyclopentadiene as a base material. The relay lens 2, the collimating lens 5, the diffraction lens 8, the objective lens 9 for blue-violet light, the detection lens 13, and the objective lens 19 for red/infrared light are examples of the optical element. In the present embodiment, the cycloolefin polymer is a material having a modules of elasticity in bending of about 3.1E+9 Pa. This information is described here based on the product information of "ZEONEX (registered trademark) 330R" published by Nippon Zeon Corporation.

The λ/2 plate 3 for blue-violet light, the flip-up mirror 6 for blue-violet light, the λ/4 plate 7 for blue-violet light, the plate beam splitter 11, the first diffraction element 12, the second diffraction element 16, the flip-up mirror 17 for red/infrared light, and the λ/4 plate 18 for red/infrared light are made of glass. The beam splitter 4 is made of crystal quartz. Glass and crystal quartz are materials having higher moduli of elasticity than plastic. The materials of the λ/2 plate 3 for blue-violet light, the flip-up mirror 6 for blue-violet light, the J 4 plate 7 for blue-violet light, the plate beam splitter 11, the first diffraction element 12, the second diffraction element 16, the flip-up mirror 17 for red/infrared light, the λ/4 plate 18 for red/infrared light, and the beam splitter 4 are not limited to the above-mentioned materials. The λ/2 plate 3 for blue-violet light, the beam splitter 4, the flip-up mirror 6 for blue-violet light, the λ/4 plate 7 for blue-violet light, the plate beam splitter 11, the first diffraction element 12, the second diffraction element 16, the flip-up mirror 17 for red/infrared light, and the λJ 4 plate 18 for red/infrared light are examples of the optical element.

The lens holder 20, the collimating lens holder 21, and the base 22 are examples of the supporting member.

Figure 5:
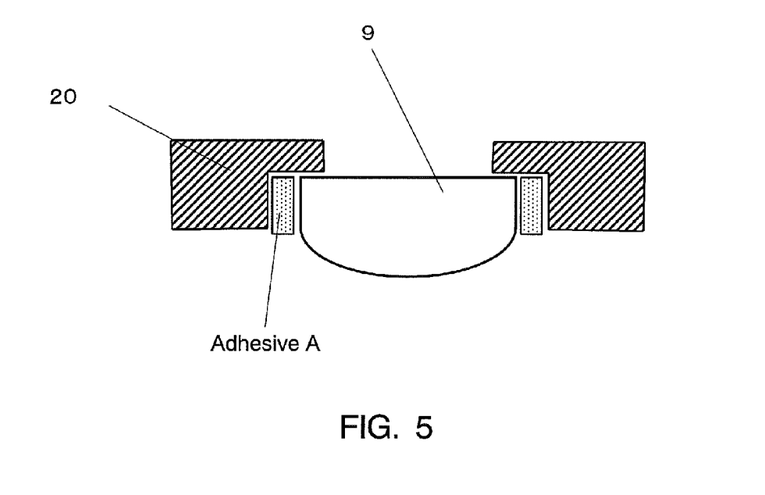
FIG. 5 is a diagram illustrating the relationship among an optical element, a supporting member, and a cured product of an adhesive.

The relationship among the optical element, the supporting member, and the cured product of the adhesive is described below. FIG. 5 is a diagram illustrating the relationship among the objective lens 9 for blue-violet light, the lens holder 20, and the cured product of an adhesive A. The objective lens 9 for blue-violet light is bonded and fixed to the lens holder 20 with the cured product of the adhesive A. The flux of light emitted from the blue-violet laser 1 follows the path as shown in FIG. 1. In this regard, part of the light enters the cured product of the adhesive, which causes the further curing of the cured product of the adhesive.

The configuration of the relationship among the optical element, the supporting member, and the cured product of the adhesive is not limited to that shown in FIG. 5. This is because light is reflected, refracted, or diffracted when it strikes a substance, and therefore the emitted light may enter the cured product of the adhesive through various paths.

<2. Temperatures of Respective Components During Operation of Optical Pickup 100>

The temperatures of the respective components in the optical pickup 100 as configured above are described. This description is made to facilitate the understanding of the present invention, and exact values are not given here.

To prevent product quality problems, the surface temperature of a body of a final product (for example, a personal computer, an optical disc recorder, etc.) equipped with the optical pickup 100 is maintained within the range of 0 to 40° C. Assume that the surface temperature of a personal computer equipped with the optical pickup 100 is 40° C., for example. In this case, the surface temperature of the optical pickup 100 is, for example, about 60° C. In such a case, the surface temperature of the blue-violet laser 1 rises to about 65 to 85° C., although the rise in the temperature varies depending on the power required for the current operation, reproduction or recording. The surface temperature of the cured product of the adhesive for the objective lens 9 for blue-violet light also rises to about 65 to 85° C., under the influence of the surface temperature of the blue-violet laser 1 and of the heat generation in a magnetic circuit not shown, such as a coil means mounted on the lens holder 20 to move the objective lens 9 for blue-violet light. That is, when the optical pickup 100 is in operation, the cured product of the adhesive for the objective lens 9 for blue-violet light always has a higher temperature than the surface temperature of the body of a final product.

<3. Description of Cured Products of Adhesives for Respective Components>

<3.1 Adhesive A>

In the present embodiment, the adhesive A described below is used to bond the diffraction lens 8 and the objective lens 9 for blue-violet light respectively to the lens holder 20, to bond the collimating lens 5 to the collimating lens holder 21, and to bond the relay lens 2 and the detection lens 13 respectively to the base 22.

The adhesive A is composed of 65 to 75% by weight of an acrylate monomer, 20 to 30% by weight of an elastomer as a thermoplastic elastic material, and less than 10% by weight of a photopolymerization initiator. That is, the cured product of the adhesive A contains 20 to 30% by weight of the thermoplastic elastic material, and when the content of the thermoplastic elastic material is in this range, the cured product of the adhesive A is highly effective in alleviating the stresses generated by the further curing of the cured product itself and also has good adhesion properties.

Figure 2:
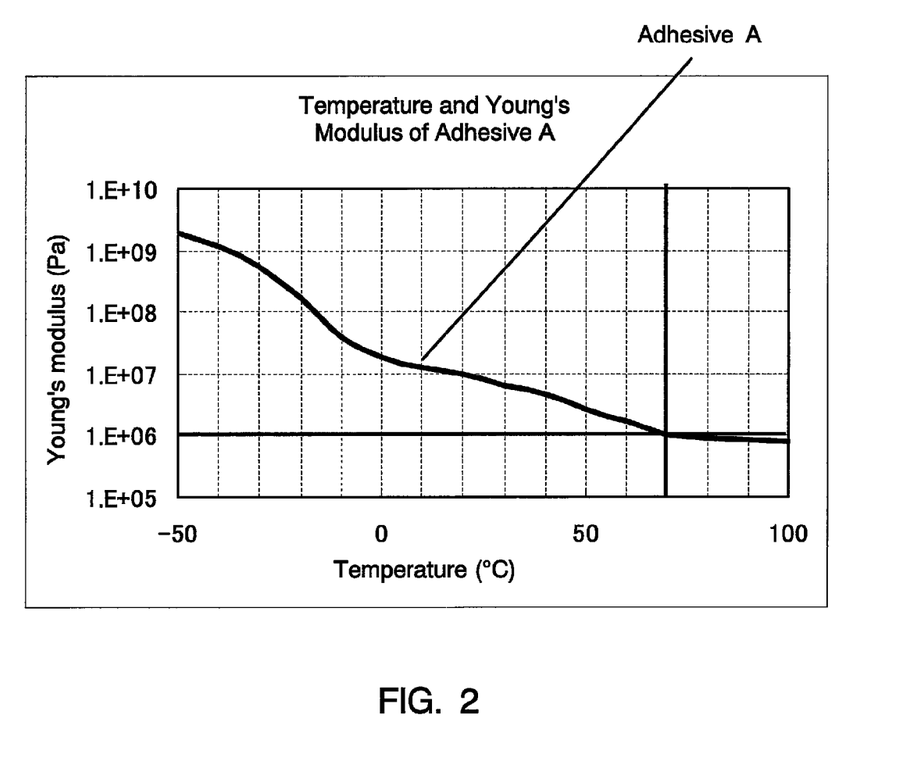
FIG. 2 is a graph illustrating the Young's modulus of a cured product of an adhesive A according to the embodiment of the present invention.

FIG. 2 is a graph showing the Young's modulus of the cured product of the adhesive A obtained by exposing the adhesive A to UV radiation with respect to the temperature thereof. As shown in this graph, the cured product of the adhesive A is a material exhibiting lower elasticity as the temperature increases from room temperature. To obtain this measurement data, the adhesive A was exposed to 30 kJ/m$^2$ UV radiation with a dominant wavelength of 365 nm at a distance of 15 cm by using a high-pressure mercury lamp. The Young's moduli were measured at different temperatures using a dynamic mechanical analyzer. The dynamic mechanical analyzer is an instrument for determining the mechanical properties of samples by applying a strain or a stress that varies (fluctuates) with time to the samples and measuring the resulting stress or strain in the samples (see JIS K 7244 "Plastics—Determination of Dynamic Mechanical Properties"). In FIG. 2, the horizontal axis represents the temperature (° C.), and the vertical axis represents the Young's modulus (Pa).

The dimensions of the sample whose test result is shown in FIG. 2 are as follows:

Dimensions of Sample of Cured Product of Adhesive A
Length: 20.000 mm
Width: 10.368 mm
Thickness: 1.069 mm As shown in FIG. 2, the cured product of the adhesive A has a Young's modulus of at least 1.0E+5 Pa but less than 1.0E+7 Pa in the temperature range of 65° C. to 85° C., and a Young's modulus of about 1.0E+6 Pa at a temperature of about 70° C. That is, the cured product of the adhesive A has a Young's modulus of at least 1.0E+5 Pa but less than 1.0E+7 Pa in the surface temperature range of the objective lens 9 for blue-violet light during the operation of the optical pickup 100. When an adhesive has a Young's modulus of at least 1.0E+6 Pa but less than 1.0E+8 Pa, the adhesive is in the "rubber region", that is, in the rubber state. When an adhesive has a Young's modulus of at least 0.0 Pa but less than 1.0E+6 Pa, the adhesive is in the "gel region", that is, in the gel state.

It is found, based on the measurement results of the Young's moduli of the cured products of the conventional adhesives B and C described later, that the cured product of the adhesive A having this particular Young's modulus mentioned above can be softened due to a temperature increase during the operation of the optical pickup 100 and can alleviate the stresses generated by the further curing of the cured product of the adhesive A.

As an elastomer contained in the adhesive A, a thermoplastic elastomer was used. That is, the thermoplastic elastomer is used as the thermoplastic elastic material. This thermoplastic elastomer has the property of being softened and exhibiting fluidity when it is heated and it returns to the rubber-like elastic body when it is cooled. There is no particular limitation on the thermoplastic elastomer. Various types of thermoplastic elastomers, such as styrene-type (SBC), olefin-type (TPO), vinyl chloride-type (TPVC), urethane-type (PU), ester-type (TPEE), and amide-type (TPAE) elastomers, can be used.

The adhesive A is cured when it is exposed to light (ultraviolet light) with any of the wavelengths ranging from 320 nm to 380 nm. Therefore, in order to bond and fix the optical element (for example, the objective lens 9 for blue-violet light) to the supporting member (for example, the lens holder 20), the optical element to which the adhesive A has been applied is fixed to the supporting member, and then the adhesive A is irradiated with ultraviolet light. For example, an LED can be used as an ultraviolet light source.

As described above, when the adhesive A is used to bond and fix the plastic optical element (for example, the objective lens 9 for blue-violet light) placed in the optical path of the blue-violet laser 1 to the supporting member (for example, the lens holder 20), the occurrence of aberrations caused by the stresses generated by the further curing of the cured product of the adhesive A by the light from the blue-violet laser 1 can be reduced.

<3.2 Adhesive B>

In the present embodiment, an adhesive B shown below is used to bond the λ/4 plate 7 for blue-violet light, the λ/4 plate 18 for red/infrared light, and the objective lens 19 for red/infrared light respectively to the lens holder 20, and to bond the λ/2 plate 3 for blue-violet light, the beam splitter 4, the flip-up mirror 6 for blue-violet light, the plate beam splitter 11, the first diffraction element 12, the second diffraction element 16, and the flip-up mirror 17 for red/infrared light respectively to the base 22.

The adhesive B is composed of 25 to 35% by weight of an acrylate oligomer, 55 to 65% by weight of an acrylate monomer, less than 0.5% by weight of toluene, and less than 10% by weight of a photopolymerization initiator.

Figure 3:
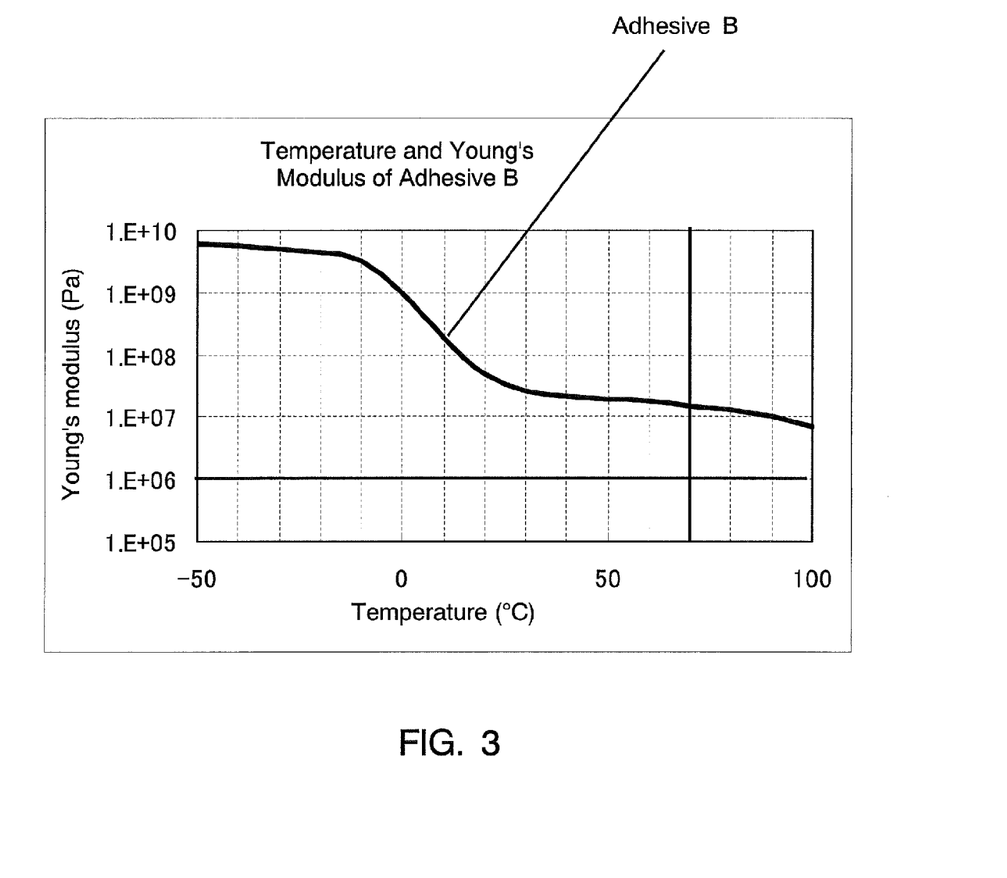
FIG. 3 is a graph illustrating the Young's modulus of a cured product of an adhesive B according to the embodiment of the present invention.

FIG. 3 is a graph showing the Young's modulus of the cured product of the adhesive B obtained by exposing the adhesive B to UV radiation with respect to the temperature thereof. To obtain this measurement data, the adhesive B was exposed to 30 kJ/m² UV radiation with a dominant wavelength of 365 nm at a distance of 15 cm by using a high-pressure mercury lamp. The Young's moduli were measured at different temperatures using a dynamic mechanical analyzer. In FIG. 3, the horizontal axis represents the temperature (° C.), and the vertical axis represents the Young's modulus (Pa).

The dimensions of the sample whose test result is shown in FIG. 3 are as follows:
Dimensions of Sample of Cured Product of Adhesive B
Length: 20.000 mm
Width: 9.600 mm
Thickness: 1.8 mm FIG. 2 and FIG. 3 show that unlike the cured product of the adhesive A, the Young's modulus of the cured product of the adhesive B is not close to 1.0E+6 Pa at a temperature of about 70° C. Therefore, the cured product of the adhesive B is not softened so much as the cured product of the adhesive A when the temperature increases from room temperature.

The adhesive B is a conventional material that causes the problem when it is used to bond the plastic optical element in the optical path of the blue-violet laser 1.

The λ/2 plate 3 for blue-violet light, the beam splitter 4, the flip-up mirror 6 for blue-violet light, the λ/4 plate 7 for blue-violet light, the plate beam splitter 11, and the first diffraction element 12 are made of materials harder than plastic. Therefore, even if the cured product of the adhesive B is cured further by the light from the blue-violet laser 1 and the optical element is strained (distorted) accordingly, this strain is not so large as to cause such a problem. Therefore, in the present embodiment, the adhesive B is used in the optical path of the blue-violet laser 1. Since the cured product of the adhesive B has a higher Young's modulus than that of the adhesive A, the components can be bonded and fixed more strongly, and the oscillation or the resonance of the optical components can be reduced or their oscillation frequencies can be shifted to high frequencies that do not affect the servo characteristics of the optical pickup.

The optical elements (the second diffraction element 16, the flip-up mirror 17 for red/infrared light, the λ/4 plate 18 for red/infrared light, and the objective lens 19 for red/infrared light) placed only in the optical path of the red/infrared laser 10 may be bonded with any type of adhesive because they do not cause the problem of the blue-violet laser 1. Although the objective lens 19 for red/infrared light is a plastic optical element, the adhesive B is used therefor. As a result, the range of choices of adhesives, including the costs of the adhesives, can be expanded.

<3.3 Absorption Spectra of Adhesives>

Figure 7:
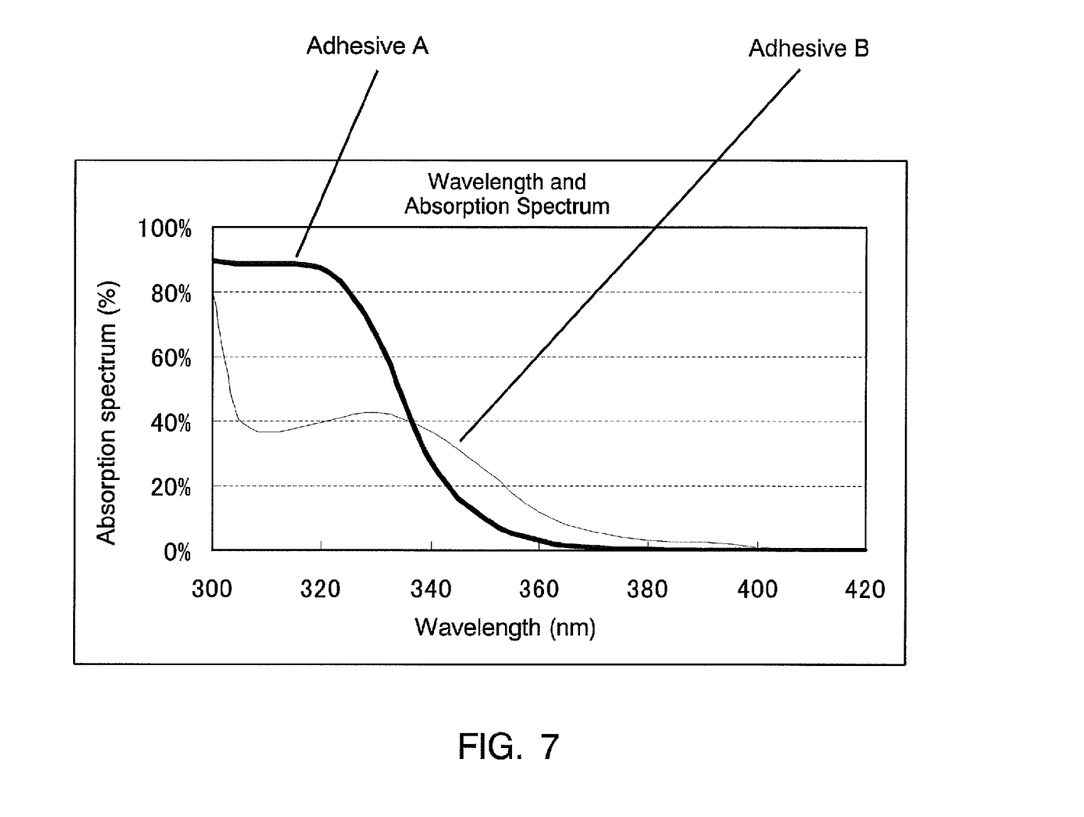
FIG. 7 is a graph showing the absorption spectra of the adhesive A and the adhesive B.

The adhesives A and B were irradiated with various types of light to obtain their absorption spectra and compare them with each other. The absorption spectrum is a spectrum of light, whose intensity at each wavelength of light from a light source corresponds to the amount of light absorbed by a test substance (such as the adhesive A or the adhesive B), and an indicator of the wavelength of light absorbed most by the adhesive, that is, the wavelength of light at which the adhesive is cured most easily. The absorption spectrum was measured at a room temperature with a Fourier transform infrared spectroscopy. FIG. 7 shows the absorption spectra of the adhesive A and the adhesive B. In FIG. 7, the horizontal axis represents the wavelength of the irradiated light, and the vertical axis represents the absorbance.

FIG. 7 shows that the adhesive A absorbs less light with a wavelength of 405 nm than the adhesive B. This fact also seems to contribute to preventing the problem caused by the further curing of the cured product of the adhesive in the optical path of the blue-violet laser.

Accordingly, it is preferable, in the present invention, that the cured product of the adhesive does not show light absorption in the wavelength range of the light emitted from the light source. In this case, the further curing of the cured product of the adhesive, which causes the above problem when it is used to fix the optical element in the optical path of the blue-violet laser, is inhibited. The type of the photopolymerization initiator in the adhesive to be used may be selected appropriately in order to prevent the cured product of the adhesive from showing light absorption in the wavelength range of the light emitted from the light source.

<4. Conclusion>

In the optical pickup 100 of the present embodiment, the specific adhesive A is used to bond and fix the plastic optical elements (for example, the objective lens 9 for blue-violet light) located in the optical path of the blue-violet laser 1 to the supporting member (for example, the lens holder 20). The adhesive A is characterized in that it contains a thermoplastic elastic material. The cured product of this adhesive A is characterized in that it has a Young's modulus of at least 1.0E+5 Pa but less than 1.0E+7 Pa in an exponential expression, in a temperature range that the cured product of the adhesive A reaches due to heat generation during the operation of the optical pickup 100.

Because of these features, the stresses generated in the optical element by the cured product of the adhesive A are alleviated even when the cured product of the adhesive A is cured further as the use of the optical pickup 100 increases, that is, as the continuous lighting time of the blue-violet laser increases. As a result, aberrations such as astigmatism and coma in the optical element can be reduced.

(Other Embodiments)

The first embodiment has been described as an example of the embodiments of the present invention. The present invention is, however, not limited to the first embodiment, and can be implemented in other embodiments. The other embodiments of the present invention are described together below.

In the first embodiment, the adhesive B is used for some of the optical elements. The present invention is, however, not limited to this, and the adhesive C may be used instead of the adhesive B. The adhesive C has, for example, the following composition.

The adhesive C is composed of 80 to 90% by weight of an acrylate oligomer, 5 to 15% by weight of a methacrylate monomer, and less than 5% by weight of a photopolymerization initiator. Like the adhesive B, the adhesive C is a conventional material that causes the problem when it is used to bond the plastic optical element in the optical path of the blue-violet laser 1.

Figure 4:
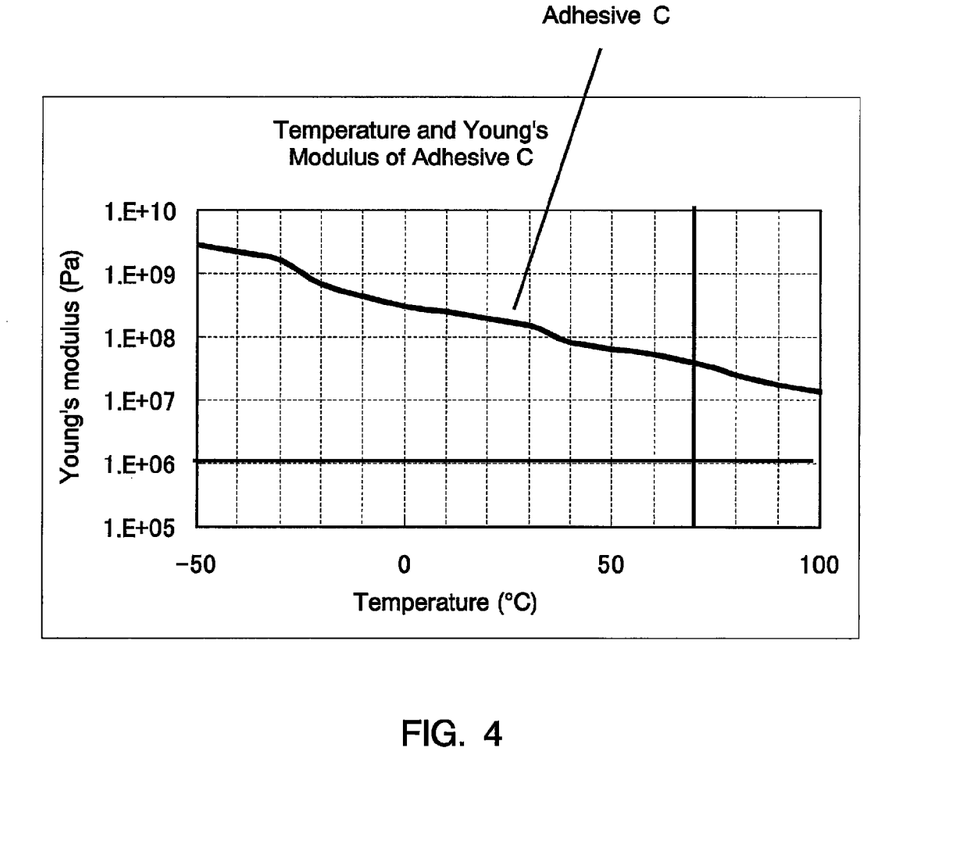
FIG. 4 is a graph illustrating the Young's modulus of a cured product of an adhesive C according to the embodiment of the present invention.

FIG. 4 is a graph showing the Young's modulus of the cured product of the adhesive C obtained by exposing the adhesive C to UV radiation with respect to the temperature thereof. The Young's moduli were measured at different temperatures using a dynamic mechanical analyzer. In FIG. 4, the horizontal axis represents the temperature (° C.), and the vertical axis represents the Young's modulus (Pa).

The dimensions of the sample whose test result is shown in FIG. 4 are as follows:
Dimensions of Sample of Cured Product of Adhesive C
Length: 20.000 mm
Width: 12.228 mm
Thickness: 1.167 mm FIG. 2 and FIG. 4 show that, unlike the cured product of the adhesive A, the Young's modulus of the cured product of the adhesive C is not close to 1.0E+6 Pa at a temperature of about 70° C. Therefore, the cured product of the adhesive C is not softened so much as the cured product of the adhesive A when the temperature increases from room temperature.

In the first embodiment, the adhesive B is used for the optical elements located outside the optical path of the blue-violet laser. The present invention is, however, not limited to this. In the configuration in which a part of the cured products of the adhesive located outside the optical path of the blue-violet laser is irradiated with stray components or the like of the blue-violet laser light, the adhesive A may be used for the bonding of this part.

In the first embodiment, an acrylic material is used as the material of the adhesive A. The present invention is, however, not limited to this. An epoxy material may be used. For example, an epoxy oligomer can be used as the epoxy material. Like the acrylic material, this epoxy material also is a photo-curing material that is cured further when exposed to light emitted from the light source.

The present invention is not limited to the first embodiment, and may be embodied in various forms.

Industrial Applicability

The present invention is applicable to apparatuses including optical pickups, such as reproducing apparatuses (players), recording apparatuses (recorders), and personal computers. The present invention also is applicable to exposure devices used for manufacturing semiconductor chips.

What is claimed is:

1. An optical device comprising:
   a light source;
   an optical element to be irradiated with light emitted from the light source; and
   a supporting member for supporting the optical element through a cured product of an adhesive,
   wherein the adhesive comprises a photo-curing component and a thermoplastic elastic material.

2. The optical device according to claim 1, wherein the thermoplastic elastic material is a thermoplastic elastomer.

3. The optical device according to claim 1, wherein the content of the thermoplastic elastic material in the cured product of the adhesive is 20 to 30% by weight.

4. The optical device according to claim 1, wherein the optical element is made of a plastic material having a lower modulus of elasticity than glass.

5. The optical device according to claim 1, wherein the light source emits light with a center wavelength of 405 nm.

6. The optical device according to claim 1, wherein the cured product of the adhesive does not show light absorption in a wavelength range of the light emitted from the light source.

7. The optical device according to claim 1, wherein the photo-curing component comprises a polymerizable compound and a photopolymerization initiator.

* * * * *